UNITED STATES PATENT OFFICE.

EMIL BRONNERT, OF DORNACH, AND MAX FREMERY AND JOHANN URBAN, OF DREMMEN, GERMANY.

PROCESS OF PREPARING SOLUTIONS OF CELLULOSE FOR THE MANUFACTURE OF THREAD.

SPECIFICATION forming part of Letters Patent No. 672,350, dated April 16, 1901.

Application filed February 2, 1901. Serial No. 45,729. (No specimens.)

*To all whom it may concern:*

Be it known that we, EMIL BRONNERT, residing at Niedermorschweiler, Dornach, Mulhausen, and MAX FREMERY and JOHANN URBAN, residing at Oberbruch Post, Dremmen, Rheinpreussen, Germany, citizens of Germany, have invented a certain new and useful Process of Preparing a Solution of Cellulose for the Manufacture of Thread, (for which we have applied for a patent in Germany, dated July 9, 1900,) of which the following is a specification.

Besides ammoniacal solutions of cupric hydroxid similar solutions of other cupric salts dissolve cellulose, as is known. Hitherto, however, solutions of cellulose in ammoniacal cupric hydroxid solutions have alone been used for making artificial silk-like threads. By the present invention there is prepared a solution of cellulose in an ammoniacal solution of cupric carbonate, which by reason of its high content of cellulose is well adapted for the manufacture of artificial thread. For this purpose an aqueous solution containing sixteen to eighteen per cent. of ammonia is saturated in the cold—that is, at a temperature between −5° centigrade and +5° centigrade—with cupric carbonate, and the cellulose is dissolved in this liquid. Such a solution of cupric carbonate contains more of this salt than does one prepared at a higher temperature. The dissolution of the cellulose in the cupric-carbonate solution is also preferably effected within the limits of temperature above named, as it is then more rapid. Moreover, it is advantageous to keep the prepared solution at a low temperature—say between 0° centigrade and 10° centigrade—up to the moment when it is to be manufactured into thread, as in this manner any decomposition of the cellulose which might diminish the ease with which the solution can be manufactured into threads and the strength of the finished thread is absolutely avoided.

Solutions of cellulose prepared according to this invention have the advantage that they may contain more copper than corresponds with the equimolecular proportion of copper salt to cellulose, which is preferable when cupric hydroxid is employed. Furthermore, since salts of copper, like cupric carbonate, have no oxidizing action on cellulose solutions of the latter in ammoniacal cupric carbonate are more stable than solutions of cellulose in ammoniacal cupric hydroxid. Thus even after a long time neither is the ammonia oxidized to nitrous acid nor the cellulose to oxycellulose.

The cellulose used may be the usual degreased and bleached cotton, although it is advantageous for the preparation of solutions containing a high content of cellulose to use cellulose which has undergone one of the known preparatory processes.

The conversion of the solution into thread is effected in the known manner—namely, by causing the solution to flow through a capillary opening into dilute acid and winding on a spool the cellulose thread as it is separated from its solvent.

The finished thread behaves like pure cellulose. Substantive dyestuffs dye it directly. Basic dyestuffs only properly dye the thread after this has been mordanted with, for instance, tanning and tartar emetic.

Having thus particularly described and ascertained the nature of our said invention and the best means we know of carrying the same into practical effect, we claim—

1. The process of preparing a solution of cellulose for the manufacture of thread by saturating an aqueous solution containing sixteen to eighteen per cent. ammonia, and at a temperature between −5° centigrade and +5° centigrade with cupric carbonate and dissolving cellulose in this solution substantially as described.

2. As a new article of manufacture a solution of cellulose in an aqueous solution containing sixteen to eighteen per cent. of ammonia and saturated at a temperature between −5° centigrade and +5° centigrade, with cupric carbonate.

In testimony whereof we have hereunto set our hands in presence of the subscribing witnesses.

EMIL BRONNERT.
MAX FREMERY.
JOHANN URBAN.

Witnesses to the signature of E. Bronnert:
ALBERT GRAETER,
GEORGE GIFFORD.

Witnesses to the signatures of M. Fremery and J. Urban:
GUSID FLIEG,
C. E. BRUNDAGE.